United States Patent
Guey

(10) Patent No.: US 8,295,311 B2
(45) Date of Patent: Oct. 23, 2012

(54) DETECTION OF TIME-FREQUENCY HOPPING PATTERNS

(75) Inventor: Jiann-Ching Guey, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 497 days.

(21) Appl. No.: 12/438,623

(22) PCT Filed: Sep. 11, 2006

(86) PCT No.: PCT/US2006/035128
§ 371 (c)(1),
(2), (4) Date: Feb. 24, 2009

(87) PCT Pub. No.: WO2008/003117
PCT Pub. Date: Mar. 20, 2008

(65) Prior Publication Data
US 2010/0238787 A1    Sep. 23, 2010

(51) Int. Cl.
*H04J 3/06*    (2006.01)
(52) U.S. Cl. .............. 370/509; 370/208; 370/324
(58) Field of Classification Search .......... 370/208, 370/324, 509
See application file for complete search history.

(56) References Cited

U.S. PATENT DOCUMENTS

| | | | |
|---|---|---|---|
| 6,047,171 A | 4/2000 | Khayrallah et al. | |
| 6,088,416 A | 7/2000 | Perahia et al. | |
| 6,320,843 B1 | 11/2001 | Rydbeck et al. | |
| 6,332,006 B1 | 12/2001 | Rydbeck et al. | |
| 6,480,556 B1 | 11/2002 | Guey | |
| 6,594,793 B1 | 7/2003 | Guey | |
| 6,671,309 B1 | 12/2003 | Craig et al. | |
| 6,754,253 B2 | 6/2004 | Guey | |
| 6,842,487 B1 | 1/2005 | Larsson | |
| 6,961,364 B1 | 11/2005 | Laroia et al. | |
| 6,990,153 B1 | 1/2006 | Farhang-Boroujeni et al. | |
| 7,248,559 B2 | 7/2007 | Ma et al. | |
| 7,292,651 B2 | 11/2007 | Li | |
| 7,369,531 B2 | 5/2008 | Cho et al. | |
| 7,433,419 B2 | 10/2008 | Yun et al. | |
| 7,630,463 B2 * | 12/2009 | Shin et al. .............. 375/344 |
| 7,711,029 B2 | 5/2010 | Guey | |
| 2001/0033606 A1 | 10/2001 | Akopian et al. | |
| 2002/0106008 A1 | 8/2002 | Guey | |

(Continued)

FOREIGN PATENT DOCUMENTS

EP    1 489 808 A2    12/2004

(Continued)

OTHER PUBLICATIONS

International Search Report for PCT/US2006/035128, mailed May 7, 2007.

(Continued)

*Primary Examiner* — Jason Mattis
(74) *Attorney, Agent, or Firm* — Nixon & Vanderhye P.C.

(57) ABSTRACT

The present invention relates to a method for detecting a pilot pattern, comprising a pilot signal $s_p(t)$, in a received signal $r(t)$ implemented in an Orthogonal Frequency Division Multiplexing (OFDM) system. The method comprises the steps: computing a value of a log-likelihood function $\Lambda(\tau_0,\nu_0)$ for a hypotheses space specified by the pilot signal $s_p(t)$ and an initial time frequency offset $(\tau_0,\nu_0)$, and relating the computed value to a reference value to detect the pilot pattern.

14 Claims, 5 Drawing Sheets

U.S. PATENT DOCUMENTS

| | | | |
|---|---|---|---|
| 2003/0147480 A1 | 8/2003 | Richards et al. | |
| 2003/0231714 A1* | 12/2003 | Kjeldsen et al. | 375/259 |
| 2004/0071110 A1 | 4/2004 | Guey et al. | |
| 2004/0095902 A1 | 5/2004 | Laroia et al. | |
| 2004/0257979 A1 | 12/2004 | Ro et al. | |
| 2005/0088960 A1 | 4/2005 | Suh et al. | |
| 2005/0099939 A1 | 5/2005 | Huh et al. | |
| 2005/0147024 A1 | 7/2005 | Jung et al. | |
| 2005/0226141 A1 | 10/2005 | Ro et al. | |
| 2005/0238083 A1 | 10/2005 | Laroia et al. | |
| 2005/0249181 A1 | 11/2005 | Vijayan et al. | |
| 2006/0039318 A1 | 2/2006 | Oh et al. | |
| 2006/0045001 A1 | 3/2006 | Jalali | |
| 2006/0088133 A1 | 4/2006 | Chen et al. | |
| 2006/0120272 A1 | 6/2006 | Wang et al. | |
| 2007/0036179 A1 | 2/2007 | Palanki et al. | |
| 2007/0053282 A1 | 3/2007 | Tong et al. | |
| 2007/0127553 A1 | 6/2007 | Miller et al. | |
| 2007/0153930 A1* | 7/2007 | Reid | 375/260 |
| 2007/0189404 A1* | 8/2007 | Baum et al. | 375/260 |
| 2008/0170602 A1 | 7/2008 | Guey | |
| 2008/0170608 A1 | 7/2008 | Guey | |
| 2008/0310484 A1 | 12/2008 | Shattil | |
| 2009/0285173 A1 | 11/2009 | Koorapaty et al. | |

FOREIGN PATENT DOCUMENTS

| | | |
|---|---|---|
| EP | 1 650 921 | 4/2006 |
| JP | 2003-69526 A | 3/2003 |
| JP | 2006-148884 | 6/2006 |
| WO | 2007/064286 A | 6/2007 |

OTHER PUBLICATIONS

Jung, Y-H et al., "Use of Periodic Pilot Tones for Identifying Base Stations of FH-OFDMA Systems", IEEE Communications Letters, vol. 10, No. 3, (Mar. 2006), pp. 192-194.

Van De Beek, J-J et al., "ML Estimation of Time and Frequency Offset in OFDM Systems", IEEE Transactions on Signal Processing, vol. 45, No. 7, (Jul. 1997), pp. 1800, col. 2—1802, col. 2—1804, col. 2.

Garcia, F-G. et al., "Tracking of Time-Frequency Misalignments in 2D-pilot-symbol-aided coherent OFDM systems", Vehicular Technology Conference, 2000, vol. 4, ( Sep. 24, 2000), pp. 1704-1709.

English translation of Chinese Office Action mailed Feb. 11, 2011 in Chinese Application 200680055783.7.

McNair et al, "OFDM for High Data Rate, High-Mobility, Wide-Area Wireless Communications", Proc. IEEE Sarnoff Symposium, Princeton, NJ, Mar. 2001.

Popovic et al, "User Traffic Multiplexing on OFDM Downlink", Spread Spectrum Techniques and Applications, 2004, IEEE Eighth Int'l. Symposium, 30 Aug.—2 Spet. 2004, pp. 429-433.

International Search Report/Written Opinion mailed May 16, 2007 in PCT application PCT/SE2006/050455.

Chang et al, "Transmitter Architecture for Pulsed OFDM" *Proceedings, IEEE Asia Pacific Conference on Circuits and Systems*, pp. 693-696, 2004.

U.S. Office Action mailed Feb. 16, 2011 in related U.S. Appl. No. 11/760,659.

International Search Report mailed Nov. 7, 2008 in corresponding PCT application PCT/SE2007/051054.

Raghavendra et al, Exploiting Hopping Pilots for Parametric Channel Estimation in OFDM Systems, Signal Processing Letters, IEEE, vol. 12, No. 11, Nov. 2005, pp. 737-740.

U.S. Office Action mailed Feb. 17, 2011 in related application U.S. Appl. No. 11/760,654.

Uysal, et al, "A Space-Time Block-Coded OFDM Scheme for Unknown Frequency-Selective Fading Channels" *IEEE PIMRC'01*, San Diego, USA, Oct. 2001.

Costas, "A Study of a Class of Detection Waveforms Having Nearly Ideal Range-Doppler Ambiguity Properties", Proceedings of the IEEE, vol. 72, No. 8, Aug. 1964, pp. 996-1009.

Golomb et al, "Constructions and Properties of Costas Arrays", Proceedings of the IEEE, vol. 72, No. 9, Sep. 1964, pp. 1143-1163.

Klein et al, "Multiple Access OFDM for High Bit Rate Indoor Wireless Systems", Dept. Of EECS, University of California Berkeley, Jun. 1999.

Tech. Spec., 3GPP TR 25.892, V2.0.0, $3^{rd}$ Generation Partnership Project; Technical Specification Group Radio Access Network; Feasibility Study for OFDM for UTRAN Enhancement; (Release 6), Jun. 2004.

Janjua et al, "Implementation of OFDM Transmitter Based on the IEEE 802.16d Standard", Dec. 2, 2004.

International Search Report and Written Opinion mailed Jul. 8, 2008 in PCT application PCT/SE2007/051027.

U.S. Office Action mailed Sep. 15, 2011 in U.S. Appl. No. 12/420,404.

U.S. Final Office Action mailed Feb. 24, 2012 in U.S. Appl. No. 12/420,404.

International Preliminary Report on Patentability mailed Oct. 12, 2010 in PCT Application No. PCT/SE2009/050372.

Chang et al, "Frequency Coded Waveforms for Enhanced Delay-Doppler Resolution", IEEE Transactions on Information Theory, vol. 49, No. 11, 2003, pp. 2960-2971.

Ham et al, "Inverse Filtering in the Presence of Doppler with Application to Specular Multipath Parameter Estimation", 1995 International Conference on Acoustics, Speech, and Signal Processing, 1995, vol. 5, pp. 3167-3170.

Guey et al, "Synchronization Signal Design for OFDM Based on Time-Frequency Hopping Patterns", Conference on Communications, IEEE Communications Society, 2007, pp. 4329-4334.

Benedetto et al, "International Conference on Concatenating Codes for Improved Ambiguity Behavior", Electromagnetics in Advanced Applications, 2007, pp. 464-467.

Guey, "The Design and Detection of Signature Sequences for Slot-Aligned System in Time-Frequency Selective Channel", Sep. 13, 2006.

Guey, "Optimal Detection of Time-Frequency Hopping Patterns in OFDM", Nov. 3, 2005.

Guey, "Pilot Pattern Design for OFDM", May 10, 2005.

Riga, "CDD-Based Precoding for E-UTRA Downlink MIMO", R1-063345, 3GPP TSG RAN WGI Meeting #47, Nov. 6-10, 2006.

Bauch et al, "Parameter Optimization, Interleaving and Multiple Access in OFDM with Cyclic Delay Diversity", 0-7803-8255-2/04, 2004, IEEEE, pp. 505-509.

Lodhi et al, "Performance Comparison of Space-Time Block Coded and Cyclic Delay Diversity MC-CDMA Systems", IEEE Wireless Communication, Apr. 2005, pp. 38-45.

Final Office Action mailed Aug. 8, 2011 in U.S. Appl. No. 11/760,659.

Popovic, "Spreading Sequences for Multi-Carrier CDMA Systems," IEE Colloquium on CDMA Techniques and Applications for Third Generation Mobile Systems, May 19 1997.

TSG-RAN WG1 #44bis, "E-UTR4 Random Access Preamble Design," R1-060998, Athens, Greece, Mar. 27-31, 2006.

Proakis, "Digital Communications 2nd edition." McGraw-Hill, 1989, pp. 834-835.

U.S. Office Action mailed Feb. 5, 2009 in related U.S. Appl. No. 11/292,415.

U.S. Office Action mailed Sep. 26, 2008 in corresponding U.S. Appl. No. 11/292,415.

U.S. Office Action mailed Aug. 13, 2009 in corresponding U.S. Appl. No. 11/292,415.

Philips, "Performance of LTE DL MU-MIMO with Dedicated Pilots", 3GPP Draft, R1-071403, $3^{rd}$ Generation Partnership Project (3GPP), Mobile Competence Centre, vol. RAN WG1, no. St. Julian 20070326, Mar. 22, 2007.

International Search Report/Written Opinion mailed Aug. 13, 2009 in PCT application No. PCT/SE2009/050372.

IEEE Standard 802.16e-2005 and IEEE Standard 802.16-2004/Cor1-2005 (Amendment and Corrigendum to IEEE Standard 802. 16/2004); Air Interface for Fixed and Mobile Broadband Wireless Access Systems, Amendment 2: Physical and um Access Control Layers for Combined Fixed and Mobile Operation in License Bands, Feb. 28, 2006.

IEEE 802.16m System Description Document [Draft], IEEE 802. 16m-08/003r7, Feb. 7, 2009.

J. P. Costas, Abstract of "Medium Constraints on Sonar Design and Performance", in EASCON Abstracts, 1975, p. 973.

* cited by examiner

50

| $p_2$ | $p_1+p_2$ | $p_1$ | $p_1+p_2$ | $p_1+p_2$ | $p_1+p_2$ | $p_1+p_2$ |
|---|---|---|---|---|---|---|
| $p_2$ | $p_1+p_2$ | $p_1$ | $p_1+p_2$ | $p_1+p_2$ | $p_1+p_2$ | $p_1+p_2$ |
| $p_2$ | $p_1+p_2$ | $p_1$ | $p_1+p_2$ | $p_1+p_2$ | $p_1+p_2$ | $p_1+p_2$ |
|  | $p_1$ | $p_1+6p_2$ | $p_1$ | $p_1$ | $p_1$ | $p_1$ |
| $p_2$ | $p_1+p_2$ | $p_1$ | $p_1+p_2$ | $p_1+p_2$ | $p_1+p_2$ | $p_1+p_2$ |
| $6p_1+p_2$ | $p_2$ |  | $p_2$ | $p_2$ | $p_2$ | $p_2$ |

59, 58, 55, 56, 57

Correlator output array

DETECTION OF TIME-FREQUENCY HOPPING PATTERNS

This application is the U.S. national phase of International Application No. PCT/US2006/035128, filed 11 Sep. 2006, the entire contents of which is hereby incorporated by reference.

TECHNICAL FIELD

The technology described herein is related a method for detecting a time-frequency hopping pattern in OFDM (Orthogonal Frequency Division Multiplexing) systems.

BACKGROUND

Conventionally, a wireless communication channel in a single-carrier transmission system is modeled as having a time-varying impulse response $g(\tau,t)$, which may be frequency selective for any given time t due to multipaths. The channel's frequency selectivity can be estimated by observing the known pilot signal transmitted during the time of interest whereas the time selectivity is usually tracked by observing multiples of these periodically inserted known signals.

However, in a land mobile communication environment, the channel's selectivity is mainly caused by movement of the terminal. For as long as the velocity of the movement remains constant, the channel can be modeled by a time-invariant delay-Doppler response $h(\tau,\nu)$, which represents the complex-valued channel gain of the scatterer incurring a delay $\tau$ and Doppler shift $\nu$ to the incoming signal. For various reasons, this fact has been used mostly as a design limitation on the frequency of pilot insertion in the time domain to avoid aliasing. Slightly more sophisticated usage of the Doppler information may be found in the channel tracking related filter design that requires the estimation of the channel's Doppler spread.

A time-frequency hopping pattern is a signal whose frequency contents change as a function of time, either periodically or non-periodically, in a specific manner. Time-frequency hopping signals have been used in many communication and radar applications. Recently, due to popular adaptation of Orthogonal Frequency Division Multiplexing (OFDM) as the multiple technology in future wireless communication systems, the potential for using them as synchronization signals has been under extensive investigation. Since an OFDM system essentially divides the radio resource into orthogonal time-frequency units, it is natural to design synchronization signals that conform with existing time-frequency partition.

In an OFDM system, pilot symbols are placed periodically in the time-frequency plane for channel estimation. FIG. 1 shows an example of a regularly spaced pilot pattern, denoted $\phi=0$, and a Costas array pattern, denoted $\phi=1$, which is one of many possible variations resulting from shifting the horizontal scan lines of the regularly spaced pilot pattern in a particular order, as is well known for a skilled person in the art. Costas array patterns are disclosed in "Medium Constraints on Sonar Design and Performance", by J. P. Costas, in EASCON Cony. Rec., 1975, pp 68A-68L.

Each cell in the array represents one of the $N_{fft}$ sub-carriers in an OFDM symbol, which has an interval of $T_s$ sec. including $T_{cp}$ sec. of cyclic prefix. Thus, the sub-carrier spacing is $f_s=1/(T_s-T_{cp})$ Hz. For the original regularly spaced pattern, one pilot symbol is inserted every N OFDM symbols in the time domain, i.e. $T_p=NT_s$ and every M sub-carriers in the frequency domain, i.e. $f_p=Mf_s$. Each pattern may have a sub-carrier offset index $0 \leq \phi \leq M$ with respect to the first sub-carrier.

Any pilot pattern may be specified by a two-dimensional time-frequency array whose element C[n, m] is the complex value of the pilot symbol transmitted on the m'th sub-carrier in the n'th OFDM symbol. Unless otherwise stated, C[n,m] is "1" if a pilot symbol is present and "0" if not. The corresponding continuous-time signal of the pilot pattern over Q time domain periods can be expressed as a sequence of OFDM symbols by:

$$s_p(t) = \sum_{n=0}^{QN-1} c_n(t - nT_s) \quad (1)$$

where $$c_n(t) = \sum_{i=0}^{N_{fft}-1} c_n[i]\mu(t - iT_c) \quad (2)$$

is the n'th OFDM symbol that further consists of a sequence $c_n[i]$ modulating the transmit filter pulsing function $\mu(t)$. Ignoring cyclic prefix, the pilot pattern's time-frequency array representation C[n,m] is related to the discrete-time sequence $c_n[i]$ by $$C[n, m] = \sum_{i=0}^{N_{fft}-1} c_n[i] e^{\frac{j2\pi mi}{N_{fft}}}, m = 0, 1, \ldots, N_{fft} - 1 \quad (3)$$

To demodulate the data symbols in an OFDM system, the receiver needs to know the channel's time-frequency response H(t,f), which is the two-dimensional Fourier transform of the delay-Doppler response $h(\tau,\nu)$. If sufficient numbers of the base pilot signals are observed over time and frequency, the output of the delay-Doppler correlator is a good approximation of the delay-Doppler response.

The channel is modeled as having a delay-Doppler response $h(\tau,\nu)$, which represents the complex-valued channel gain of the scatterer incurring a delay $\tau$ and Doppler shift $\nu$ to the incoming signal. Assuming that the radio environment consists of a continuum of scatterers (or "targets"), each introduces a certain delay and Doppler shift to the signal propagating through it, the received signal corresponding to the pilot is given then by:

$$r(t) = \int_{\nu_0}^{\nu_0+\nu_{max}} \int_{\tau_0}^{\tau_0+\tau_{max}} h(\tau,\nu) s_p(t-\tau) e^{j2\pi\nu t} d\tau d\nu + z(t) \quad (4)$$

where z(t) is the Additive White Gaussian Noise (AWGN), $\tau_0$ and $\nu_0$ are the initial timing and frequency offset respectively, and $$\tau_{max} \leq \frac{1}{f_p} = \frac{1}{Mf_s} = \frac{T_s - T_{cp}}{M} \quad (5)$$

$$\nu_{max} \leq \frac{1}{T_p} = \frac{1}{NT_s}$$

are the maximum delay and Doppler spread of the channel that are smaller than or equal to the values that can be supported by the pilot's density without aliasing.

Present detectors normally use correlator matched to hypothesized signals and then find peaks and compare them with a certain threshold to determine the presence of the pilot signals. This correlation process may be too computationally complex especially when there are a large number of potential hypotheses.

A known system that uses time-frequency hopping patterns as synchronization signals is disclosed in U.S. Pat. No. 6,961,364 B1, by Laroia et al. Different base stations use patterns with different slopes, and the detection algorithm is a maximum energy detector.

SUMMARY

An object with the technology described herein is to provide an apparatus and a method for detecting a pilot pattern in an OFDM system with less complex computing compared to prior art.

An additional object is to provide a method for synchronizing and detecting communication devices in a communication network.

The technology described herein solves the problem of detecting time-frequency hopping patterns of a pilot signal that meets a certain criteria in an optimal sense. By applying the principle of Generalized Likelihood Ratio Test (GLRT), the technology described herein provides an optimal likelihood measure for a given hypothesis on the pilot pattern and its time-frequency offset. Based on this likelihood measure, the detection and synchronization of a pilot pattern can be achieved.

An advantage with the technology described herein is that it may be used in an initial synchronization of an OFDM system that uses different time-frequency hopping patterns to identify different devices.

A further advantage is that though the optimal likelihood metric is the integral of the energy at the output of a two-dimensional delay-Doppler correlator, it is not necessary to actually perform the two-dimensional delay-Doppler correlation.

An advantage with an example embodiment of the technology described herein, when pilot patterns are used by a multiple of devices that share a common structure, such as circularly shifted patterns, is that the computation of their likelihood metrics may further be simplified.

DETAILED DESCRIPTION

Figure 1:
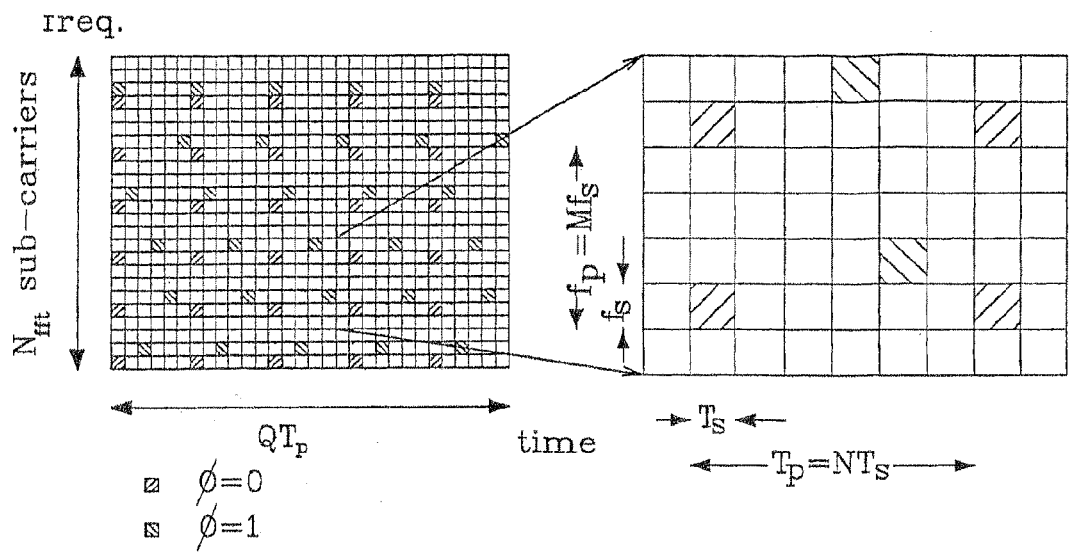
FIG. 1 shows an example of a pilot pattern used in connection with the technology described herein.

An objective with the technology described herein is to detect the presence of a pilot signal, and subsequently achieve a coarse initial time-frequency synchronization by estimating the unknown parameters $(\tau_0, v_0)$.

Assuming that the initial synchronization has been achieved and thus $(\tau_0, v_0)$ are known, the Maximum Likelihood (ML) estimation of the channel $\hat{h}_{ML}(\tau, v)$, for properly designed pilot signals such as those described above, defined over a range of $(\tau_0 \leq \tau \leq \tau_0 + \tau_{max}, v_0 \leq v \leq v_0 + v_{max})$ is related to the two-dimensional delay-Doppler image $I(\tau, v)$ by:

$$I(\tau, v) \triangleq \int r(t) s_p^*(t-\tau) e^{-j2\pi vt} dt \approx \hat{h}_{ML}(\tau, v) \otimes \chi_{sp}(\tau, v) \approx E_s \hat{h}_{ML}(\tau, v) \quad (6)$$

where $E_s = \int |s_p(t)|^2 dt$ is the energy of the pilot signal over the unspecified observation interval and $$\chi_{sp}(\tau, v) \int |s_p(t) s^*_p(t-\tau) e^{-2\pi vt} dt$$

is the ambiguity function of the pilot signal $s_p(t)$.

In the initial synchronization phase, the initial time-frequency offset $(\tau_0, v_0)$ is unknown and thus needs to be hypothesized. Therefore, the detection of the presence of a pilot pattern and subsequently the identification of the device transmitting it involves the search over the hypotheses space specified by the pilot signal $s_p(t)$ and the initial time-frequency offset $(\tau_0, v_0)$.

First, start by conditioning on a given hypothesis of $s_p(t)$ and thereafter define a likelihood measure for the hypothesis that the channel's delay-Doppler response begins at $(\tau_0, v_0)$ in the delay-Doppler plane and extends over the range of its maximum delay-Doppler spread. Since the channel response $h(\tau, v)$ is not known, it is a nuisance variable that needs to be removed. This may be accomplished by applying the same method used in the Generalized Likelihood Ratio Test (GLRT). The first step is to estimate the nuisance variable $h(\tau, v)$ assuming the hypothesis $(\tau_0, v_0)$ is correct. From Eq (6), this is given by:

$$\hat{h}_{ML}(\tau, v) = \frac{1}{E_s} I(\tau, v) \quad (8)$$

for $\tau_0 \leq \tau \leq \tau_0 + \tau_{max}$ and $v_0 \leq v \leq v_0 + v_{max}$. The next step is to replace the true channel response with its estimate in the log-likelihood function:

$$\Lambda(\tau_0, v_0) = -\int |r(t) - \int_{v_0}^{v_0+v_{max}} \int_{\tau_0}^{\tau_0+\tau_{max}} \hat{h}(\tau, v) s_p(t-\tau) e^{j2\pi vt} d\tau dv|^2 dt \quad (9)$$

After rearranging and removing irrelevant terms, the log-likelihood function for the hypothesis becomes:

$$\Lambda(\tau_0, v_0) = \int_{v_0}^{v_0+v_{max}} \int_{\tau_0}^{\tau_0+\tau_{max}} |I(\tau, v)|^2 d\tau dv \quad (10)$$

$$= \int_0^{v_{max}} \int_0^{\tau_{max}} |I(\tau+\tau_0, v+v_0)|^2 d\tau dv$$

In the generalized Maximum Likelihood sense, the optimal likelihood measure for such hypothesis is thus given by Equation (10), where $I(\tau, v)$ is the delay-Doppler image observed by the hypothesized signal $s_p(t)$.

The detection of the pilot pattern is then to evaluate and compare the values of this log-likelihood function among possible hypotheses of $s_p(t)$ and $(\tau_0, v_0)$ or to compare them with a certain threshold.

Direct evaluation of $\Lambda(\tau_0, v_0)$ from Eq. (10) is simply to perform a delay-Doppler correlation and then integrate the energy over the hypothesized range (which is the same as the hypothesis space). Although the formula is valid for all patterns that satisfy the Nyquist criterion (and can therefore be used for channel estimation), the complexity of such direct computation may be excessive for a large number of possible hypotheses that the many devices may assume. Fortunately, as will be seen in the following sections, there are alternative methods for computing the log-likelihood function without explicitly evaluating the delay-Doppler image $I(\tau,\nu)$. Even greater reduction in complexity is possible if the potential pilot patterns share a certain common structure.

Discrete Implementation of the Detector

Figure 2:
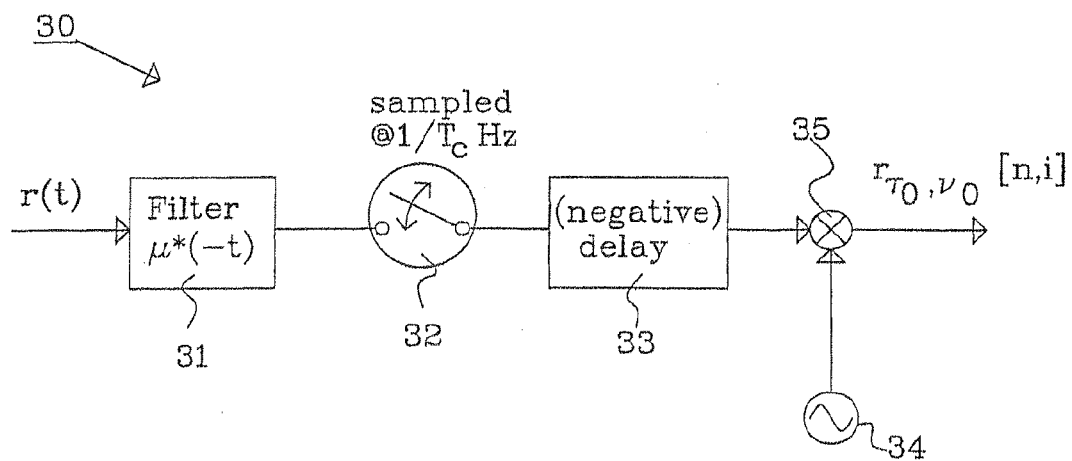
FIG. 2 shows an apparatus for producing a sampled signal from a received signal r(t).

As given in Eq. (10), the generalized log-likelihood function $\Lambda(\tau_0,\nu_0)$ is simply the integration over the hypothesized range of the energy of the channel's delay-Doppler image $I(\tau,\nu)$, whose discrete approximation over the range $(0 \leq \tau \leq \tau_{max}, 0 \leq \nu \leq \nu_{max})$ may be derived. The time-frequency shifted version of the delay-Doppler image may be expressed as:

$$I(\tau + \tau_0, \nu + \nu_0) = \int r(t) s_p^*(t - \tau - \tau_0) e^{-j2\pi(\nu+\nu_0)t} dt \quad (11)$$

$$= e^{-j2\pi(\nu+\nu_0)\tau_0} \int \tilde{r}(t) s_p^*(t - \tau) e^{-j2\pi\nu t} dt$$

where $$\tilde{r}(t) \triangleq r(t + \tau_0) e^{-j2\pi\nu_0 t} \quad (12)$$

is a time-frequency shifted version of the received signal. Since only the amplitude of the delay-Doppler image in the detection phase is of concern, the exponential term before the integral in Eq. (11) is moved to the other side of the equation and a new function for the channel's delay-Doppler image is defined:

$$I_{\tau_0,\nu_0}(\tau, \nu) \triangleq e^{j2\pi(\nu+\nu_0)\tau_0} I(\tau + \tau_0, \nu + \nu_0) \quad (13)$$

$$= \int \tilde{r}(t) s_p^*(t - \tau) e^{-j2\pi\nu t} dt$$

where the subscripts $\tau_0, \nu_0$ indicate its dependence on the initial time-frequency offset hypothesis. The integral in Eq. (13) can be expressed by its discrete sums as:

$$I_{\tau_0,\nu_0}[k, l] \triangleq I_{\tau_0,\nu_0}\left(kT_c, \frac{1}{QNT_s}\right) \quad (14)$$

$$= \sum_{n=0}^{QN-1} e^{\frac{-2\pi ln}{QN}} \int \tilde{r}(t + nT_s) c_n^*(t - kT_c) dt$$

$$\approx \sum_{n=0}^{QN-1} e^{\frac{-j2\pi ln}{QN}} \sum_{i=0}^{N_{ff}-1} r_{\tau_0,\nu_0}[n, i+k] c_n^*[i]$$

where $I_{\tau_0,\nu_0}[k,l]$ is the channel's delay-Doppler image sampled at a chip rate of $1/T_c$ Hz in the delay domain and $QNT_s$ sec. in the Doppler domain, and $$r_{\tau_0,\nu_0}[n, i] = \int \tilde{r}(t + nT_s) \mu^*(t - iT_C) dt \quad (15)$$

$$= \int r(t + nT_s + \tau_0) e^{-j2\pi\nu_0(t+nT_s)} \mu^*(t - iT_C) dt$$

$$\approx e^{-j2\pi\nu_0(iT_c+nT_s)} \int r(t + nT_s + \tau_0) \mu^*(t - iT_C) dt$$

is the output of a receive filter with a time offset $\tau_0$ and frequency offset $\nu_0$ sampled at the chip rate of $1/T_c$ Hz, as shown in FIG. 2. It is also clear that the delay hypothesis $\tau_0$ should preferably be chosen as multiples of the chip duration $T_c$.

FIG. 2 shows a device 30 for producing a sampled signal $r_{\tau_0,\nu_0}[n,i]$ from a received signal $r(t)$. The received signal is inputted to a filter 31 having a filter function $\mu^*(-t)$. The filtered signal is sampled, using a sampler 32, at a chip rate of $1/T_c$ Hz, and a negative delay is added in a delayer 33. The sampled and delayed signal is mixed with a signal from a source 34 in a mixer 35 to produce the sampled signal $r_{\tau_0,\nu_0}[n,i]$.

Discrete Frequency Domain Implementation

As stated in Eq. (5), the channel's maximum delay-Doppler spread $(\tau_{max},\nu_{max})$ should not exceed the values that can be supported by the pilot's density. For the case where the integration in Eq. (10) is carried over the maximum values supported by the pilot's density, the integration can be approximated by the discrete sums of its sampled version over the range of $(0 \leq k \leq K = N_{fft}/M, 0 \leq l < Q)$ and is given by:

$$\Lambda(\tau_0, \nu_0) = \quad (16)$$

$$\int_0^{\nu_{max}} \int_0^{\tau_{max}} |I(\tau + \tau_0, \nu + \nu_0)|^2 d\tau d\nu \approx \sum_{k=0}^{K-1} \sum_{l=0}^{Q-1} |I_{\tau_0,\nu_0}[k, l]|^2$$

The integration over a range greater than $(\tau_{max},\nu_{max})$ may degrade the detection performance since unwanted noise is introduced. However, the detection complexity may be significantly reduced as will be described in the following. The detector can then trade off between performance and complexity according to the operating requirement and equipment capability.

When positioned properly within the cyclic prefix window, the convolution in the last part of Eq. (14) becomes circular and can thus be evaluated in the frequency domain using DFT (Discrete Fourier Transform):

$$I_{\tau_0,\nu_0}[k, l] = \frac{1}{N_{fft}} \sum_{n=0}^{QN-1} \sum_{m=0}^{N_{ff}-1} R_{\tau_0,\nu_0}[n, m] C^*[n, m] e^{\frac{j2\pi ln}{QN} + \frac{j2\pi km}{N_{fft}}} \quad (17)$$

where $$R_{\tau_0,\nu_0}[n, m] = \sum_{i=0}^{N_{ff}-1} r_{\tau_0,\nu_0}[n, i] e^{-\frac{j2\pi mi}{N_{fft}}} \quad (18)$$

is the length—$N_{fft}$ DFT of the critically sampled receive signal corresponding to the n'th OFDM symbol and $$C[n, m] = \sum_{i=0}^{N_{fft}-1} c_n[i] e^{-\frac{j2\pi mi}{N_{fft}}}, m = 0, 1, \ldots, N_{fft} - 1 \quad (19)$$

is the discrete frequency domain representation of the pilot signal in the n'th OFDM symbol. Using FIG. 1 for visual illustration where the columns in the array correspond to the DFT's of the received samples over consecutive OFDM symbols for a given $(\tau_0, \nu_0)$, this embodiment approximates the likelihood function by the sum of energy over the locations of the hypothesized pattern.

Note that C[n, m] is also non-zero only when a pilot symbol is transmitted on the m'th sub-carrier in the n'th OFDM symbol. Also note that if |C(n,m)| is constant for all (non-zero) pilot symbols and if C(n,m) forms lines of constant slope in the time-frequency plane, this embodiment is reduced to the prior art given in U.S. Pat. No. 6,961,364 B1 mentioned in the background section.

Further, note that $\tilde{R}[n.m]$ can be calculated using zero-padding DFT for all possible hypotheses of the initial frequency offset $\nu_0$ if they are regularly spaced at properly chosen interval. For a particular hypothesis of $\tau_0$ for example, a length—$LN_{fft}$ sequence $$\tau_{\tau_0}[n,i] = \int r(t+nT_s+\tau_0)\mu^*(t-iT_c)dt \quad (20)$$

with zero-padding will yield a length—$LN_{fft}$ sequence in which the sub-sequence with indices $\phi, \phi+L, \ldots, \phi+L(N_{fft}-1)$ corresponds to $R_{\tau_0,\phi f_s/L}[n,m]$.

For regularly spaced pilot patterns or their hopping variants described above, the log-likelihood function for a given initial time-frequency offset hypothesis can be evaluated in the discrete frequency domain by:

$$\sum_{k=0}^{K-1} \sum_{l=0}^{Q-1} |I_{\tau_0,\nu_0}[k,l]|^2 = \sum_{n=0}^{QN-1} \sum_{m=0}^{N_{fft}-1} |R_{\tau_0,\nu_0}[n \cdot m]C^*[n,m]|^2 \quad (21)$$

which is simply the sum of received signal energy over the locations of the hypothesized pilot pattern on the discrete time-frequency plane.

Discrete Time Domain Implementation

In some cases, it may be more effective to calculate the log-likelihood metric directly in the time domain. For the pilot patterns described in connection with FIG. 1, their time-frequency map C[n,m] is non-zero only at the sub-carrier indices $\phi_n, \phi_n+M, \phi_n+2M, \ldots$, where $\phi_n$ is a hopping sequence as a function of the symbol index n and M is the pilot insertion period in that symbol (not necessarily the pilot insertion period of the original regularly-spaced pattern). Eq. (21) then becomes:

$$\sum_{k=0}^{K-1} \sum_{l=0}^{Q-1} |I_{\tau_0,\nu_0}[k,l]|^2 = \sum_{n=0}^{QN-1} \sum_{m=0}^{N_{fft}-1} |R_{\tau_0,\nu_0}[n \cdot m]C^*[n,m]|^2 \quad (22)$$

$$= \sum_{n=0}^{QN-1} \sum_{m=0}^{N_{fft}-1} |R_{\tau_0,\nu_0}[n, \phi_n + mM]|^2$$

where $K = N_{fft}/M$.

Substituting $R_{\tau_0,\nu_0}[n,m]$ from Eq. (18) with $m=\phi_n+mM$, into Eq. (22) gives:

$$\sum_{k=0}^{K-1} \sum_{l=0}^{Q-1} |I_{\tau_0,\nu_0}[k,l]|^2 = \quad (23)$$

$$K \sum_{n=0}^{QN-1} \sum_{m=0}^{M-1} \left( \sum_{i=0}^{N_{fft}-1} r_{\tau_0,\nu_0}[n,i] r_{\tau_0,\nu_0}^*[n, i-mK] \right) e^{-j\frac{2\pi \phi_n m}{M}}$$

which involves the circular self correlation of the received samples at lags that are multiples of K and a few DFT of shorter length.

Special Cases of Circularly Shifted Patterns

Figure 3:
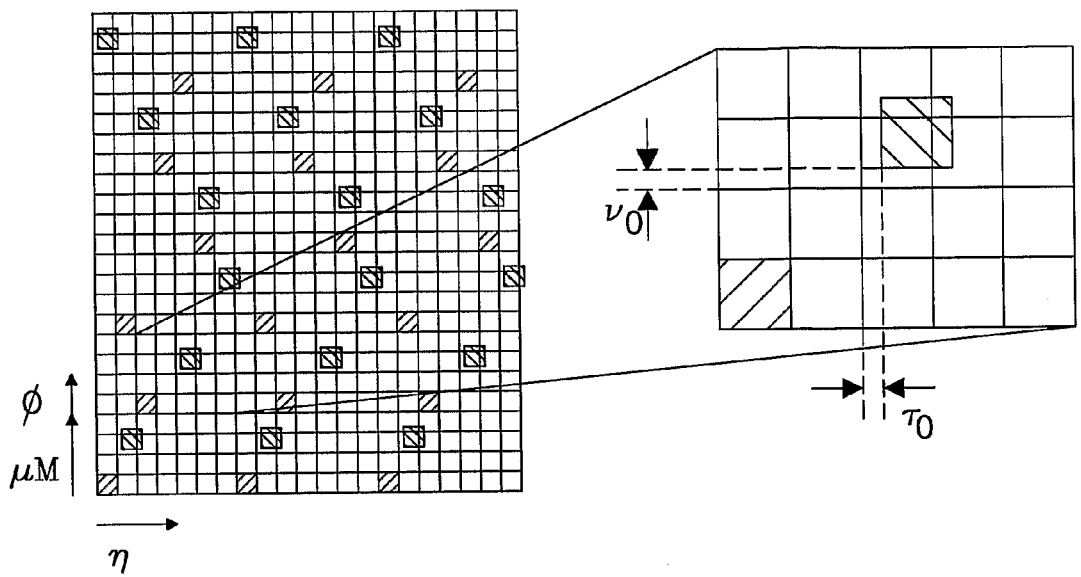
FIG. 3 shows a circularly shifted pattern of a Costas array.

The detection of multiple hopping patterns may be greatly simplified if they have a certain common structure. For example, by assigning circularly shifted patterns to different devices. The detection can then be achieved by using a two-dimensional circular correlator matched to the base pattern's time-frequency map. FIG. 3 shows circularly shifted patterns of a Costas array. A second pattern is the original pattern circularly shifted by $\eta$ OFDM symbols and $(\mu M + \phi)$ sub-carriers. As in the regularly spaced case, patterns with different sub-carrier offset $\phi$ are completely orthogonal. For a certain class of Costas arrays, two patterns with the same $\phi$ but different m have at most one coincidence per period, see example in FIG. 6. Note that for a Costas sequence of length L, there are a total of L×M×N different circular shifts for identifying different cells if they are time-synchronized. For unsynchronized network, on the other hand, there are L×M distinct circular frequency shifts.

In addition to the artificially introduced circular shift, a pilot pattern may also have a local scale time-frequency offset, due to a variety of reasons, with respect to other references such as patterns from a different base station or the sampling point of a particular terminal. This initial offset is essentially the same as, and is denoted by $(\tau_0, \nu_0)$ above except for the constraints that they are in the range of $0 \leq \tau_0 < T_s$ and $0 \leq \nu_0 < f_s$. Any offset outside this range will be folded into the indices $\eta$, $\mu$ and $\phi$. The detection of a circularly shifted pilot pattern is then to determine its presence at a hypothesized time-frequency coordinate:

$$\tau_p = \eta T_s + \tau_0$$

$$\nu_0 = (\mu M + \phi) f_s + \nu_0 \quad (24)$$

as shown in magnified scale in FIG. 3.

To demonstrate how the two-dimensional correlator may be implemented, we consider an example that is simplified from the one shown in FIG. 3 by setting the frequency domain pilot insertion period M to 1. For each hypothesis of the initial time-frequency offset $(\tau_0, \nu_0)$ an L×N (6×7) input array is formed be performing N length—L DFT over the symbol durations and placing the frequency domain samples in N successive columns, as shown by the first matrix 51 in FIG. 4. The initial time-frequency offset hypotheses should preferably be chosen as fractions of the symbol duration and the sub-carrier bandwidth to avoid duplicated computation.

Once the input array is set, the pattern search begins. First, the Costas array is expressed as a frequency-hopping sequence {0,2,1,4,5,3,x} of the symbol index, where "x" indicates a symbol with no pilot sub-carrier. This sequence is placed under the input array for visual illustration purpose. In a first step, the columns of the array are circularly rotated in row (sub-carrier) index by an amount corresponding to this hopping sequence, as illustrated in the second matrix 52 in FIG. 4, and summed across the column (symbol) indices except for the one marked by "x", resulting a column vector of size L=6. This vector is then placed in a first column 55 of an output array 50 in FIG. 5. In a second step, the Costas sequence is circularly shifted by one unit to the right and the columns of the input array 51 are circularly rotated, as illustrated by the third matrix 53 in FIG. 4, and summed as in the first step. The resulting vector is then placed in the second column 56 of the output array in FIG. 5. This process is continued until all N possible Costas sequence circular shifts are exhausted. The L×N output array 50 will then contain the generalized log-likelihood of all L×N possible hypotheses of the Costas array's circular shifts for a given $(\tau_0, v_0)$. The likelihood test and thresholding can then take place to determine if any target is present. The output array 50 shown in FIG. 5 clearly reveals two outstanding peaks, one located at $(\eta=0, \mu=0)$, denoted 58 in the first column 55 of output array 50, and the other at $(\eta=2, \mu=2)$, denoted 59 in a third column 57 of the output array 50. The vector placed in column 57 is derived from the fourth matrix 54 in FIG. 4 as described above.

Figure 4:
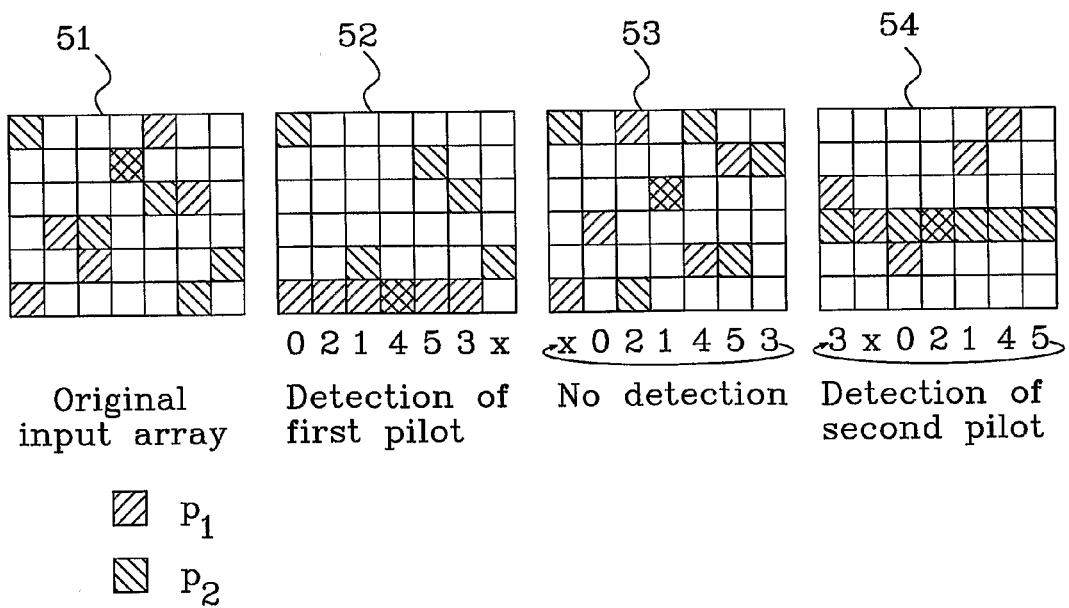
FIG. 4 shows an embodiment of a two-dimensional correlator according to the technology described herein.
Figures 5, 6:
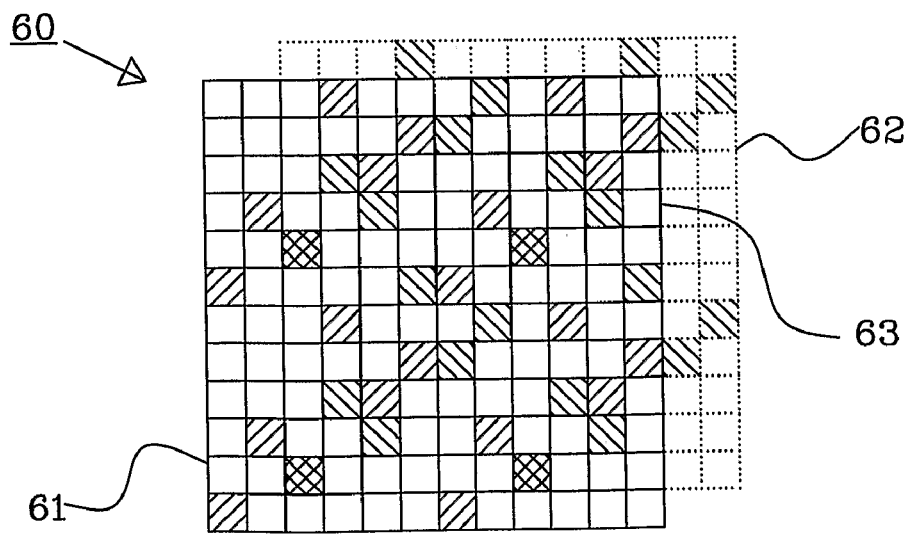
FIG. 5 shows a correlator output array in connection to FIG. 5.
FIG. 6 shows an example of two circularly shifted Costas arrays.

The correlation process illustrated in FIGS. 4 and 5 occurs off-line on a memory buffer that contains previously captured data. The same process may alternatively be carried out in real-time in a sliding window in which new data continues to arrive and fill up the array while old ones are being flushed out. In either case, the loading of the memory buffer and the circular rotation of vectors can all be accomplished by modifying address pointers without physically moving the buffer contents. Finally, even though the example shows a single period of the Costas array, the extension to multiple periods is straightforward. A computationally efficient implementation is to sum the energy in multiple periods to form the input array before the correlation takes place.

The procedure for the sliding window embodiment of this special case is briefly described below. The off-line embodiment described above is the same except that the data is already loaded into the buffer and therefore the data acquisition steps can be omitted.

1. Perform (zero-padded) DFT of appropriate length on received samples over one symbol duration. The length of the DFT depends on the hypothesis on the initial frequency offset $v_0$.
2. Place the absolute square of the DFT output in the first column of the input array.
3. Circularly rotate (either the physical content or a pointer) each of the columns in the input array in a row (sub-carrier) index by an amount corresponding to the Costas sequence.
4. Sum the input array across the column (symbol) indices and place the resulting column vector in the first column of the output array.
5. Reset the input array pointers displaced as a result of step 3 and advance the input/output arrays (circularly rotating the columns to the right) by one position.
6. Get the next segment of received samples over one symbol duration. This segment may have overlap with the previous one depending on the hypothesis on $\tau_0$.
7. Go to step 1.

Simulation Results

Figure 7:
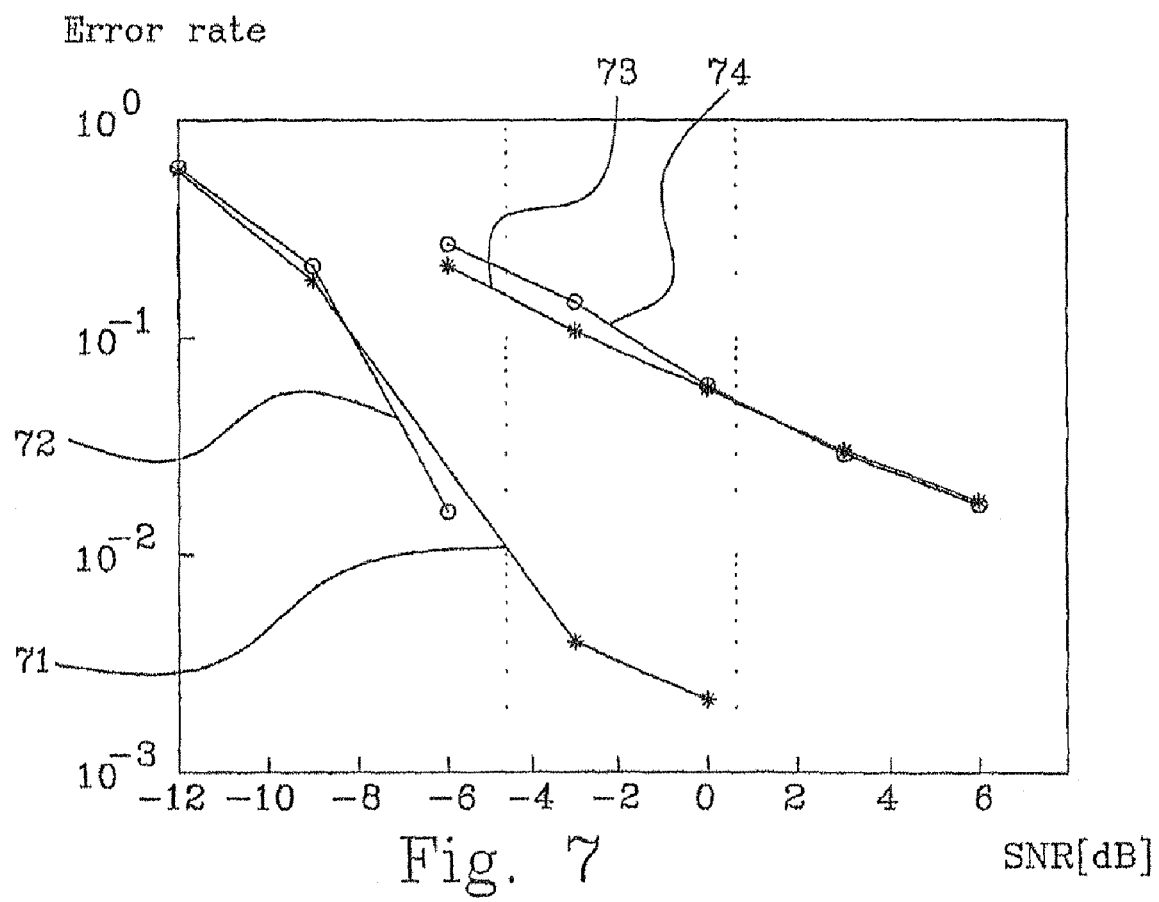
FIG. 7 shows a diagram of single-cell detection with one observation period.

To evaluate the performance of the detector, Costas array pilot patterns 60 described in FIG. 6 are considered. They are generated by circularly shifting the horizontal scan lines of a regular spaced pilot pattern. A first access point has a pilot pattern 61 with a zero-offset base signal and a second access point has a pilot pattern 62 with the base signal cyclically shifted by $nf_p$ in frequency and mT in time, as shown in FIG. 7 for (m,n)=(2,1). The number of coincidences in each period 63 between the two patterns is in this example one, since a perfectly periodic Costas sequence with N=6 GF(7) is used for both Costas pilot pattern 61, 62.

Table 1 shows the parameters of the two specific arrays that are simulated. To make a fair comparison, both have a pilot density of approximately 1/256. The OFDM symbol FFT size for length—16 array is 1024. Since M=16 in this case, the maximum delay spread that can be supported is 1024/16=64 chips, which is set at the length of the cyclic prefix. The OFDM symbol FFT size for length—30 array is 512, i.e. the OFDM symbol interval is half of that in the first array. The cyclic prefix length, however, remains the same so that same maximum delay spread can be accommodated.

TABLE 1

Parameters for two Costas arrays

| Parameter | Array 1 | Array 2 |
|---|---|---|
| N | 16 | 30 |
| M | 16 | 8 |
| $N_{fft}$ | 1024 | 512 |
| $N_{cp}$ | 64 | 64 |
| Costas sequence length L | 16 (GF17) | 30 (GF31) |
| Number of hypotheses L × M × N | 4096 | 7440 |

For each realization of the channel in the simulation, an initial random time-frequency offset $(\tau_0, v_0)$ uniformly distributed within the intervals of [0, $T_s$] and [0,$f_s$/2) is introduced. The correlator makes a single hypothesis of $(\tau_0, v_0)$=(0,0) when forming the input array. This corresponds to coarsely searching for the pilot patterns at an interval of $T_s$ sec. in the time domain and $f_s$ Hz in the frequency domain. A successful detection is declared if the true target is within one symbol and one sub-carrier on either side of the detected location. After the cell identification and coarse synchronization are achieved, further refined search to establish the boundaries of the channel's delay-Doppler response can follow. This may involve some simple interpolation in case of good SNR (Signal to Noise Ratio), or coherent DFT otherwise.

Table 2 lists a few other parameters common to all simulations. Two Power Delay-Doppler Profiles are simulated. The "Flat" channel is simply a random realization of a zero-mean Gaussian variable and the "Full" channel has a "Case3× Bessel" profile that spread the entire maximum delay-Doppler region. They represent the two extremes of the channel's diversity order. The actual performance in practice should lie somewhere in between. Unless otherwise stated, the number of periods observed over time is 1.

TABLE 2

Some additional parameters for the simulations

| Parameter | Comment | Value |
|---|---|---|
| ρ | Energy ratio between pilot and data sub-carriers | 12 dB |
| SNR ($E_c/N_0$) | Energy per chip over $N_0$ (assuming all data) | Variable |
| Q | Number of periods accumulated in time | 1 or 2 |
| $\lambda(\tau, v)$ | Power Delay-Doppler Profile | Flat or Full (Case3 × Bessel) |

FIG. 7 shows a diagram of a simulation of a single cell probability of misdetection. The solid line with stars 71 is Array 1 (Costas 16), "Full" channel, and the solid line with circles 72 is Array 2 (Costas 30), "Full" channel. The dashed line with stars 73 is Array 1 (Costas 16), "Flat" channel and the dashed line with circles is Array 2 (Costas 30), "Flat" channel. Although heavily influenced by the diversity order in the channel, the performance is very robust in the two extreme cases. The greater peak to sidelobe ratio of the second array (Costas 30) does not yield much gain until higher SNR range in the "Full" channel. This is mainly due to the fact that it has more possible hypotheses (7440) and therefore more chances to make a mistake.

The second set of simulations involves two cells that have the same sub-carrier offset $\phi=0$. The first cell is located at $(\eta,\mu)=(0,0)$ with an average SNR of 0 dB whereas the second cell is located at $(\eta,\mu)=(6,7)$ with variable signal power with respect to the first cell. In addition to the offset at the receiver mentioned earlier, the two cells have a random relative time-frequency offset that is similarly distributed. A successful detection is declared in the two-cell simulation only when both cells are successfully detected. This happens when the location of the two largest metrics in the correlation output array correspond to those of the two targets.

Figure 8:
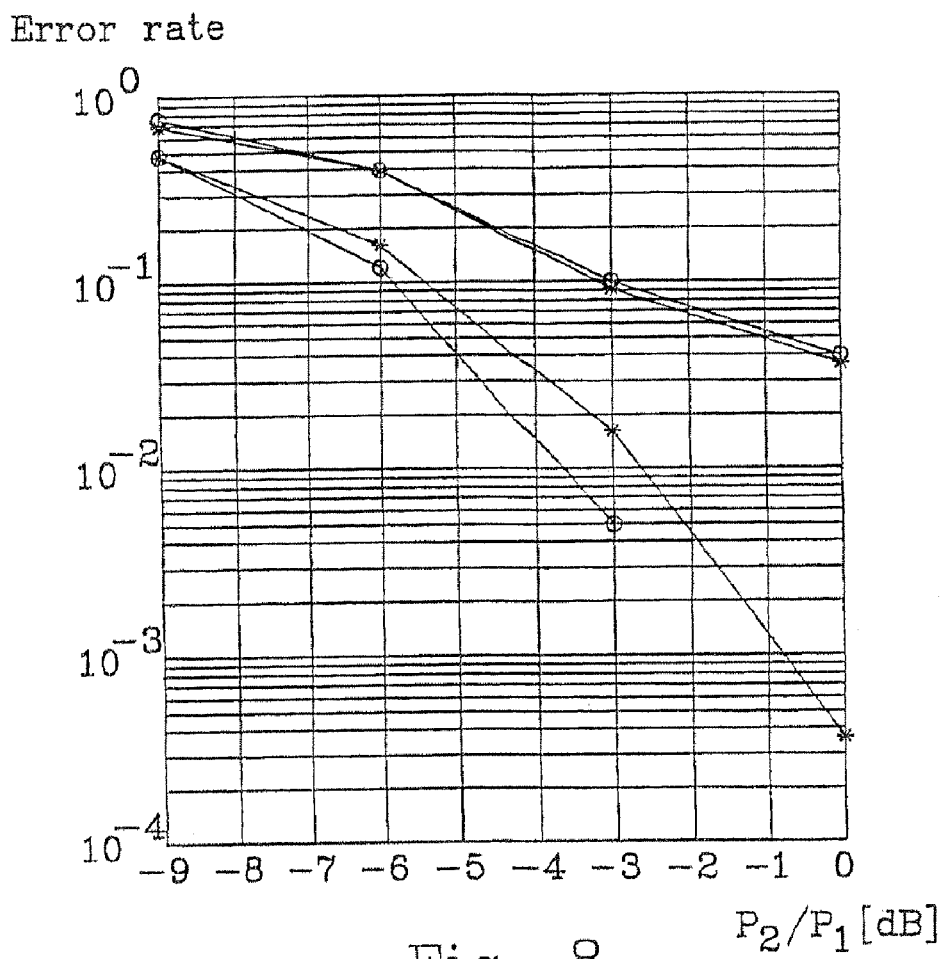
FIG. 8 shows a diagram of two-cell detection in Full channel
Figure 9:
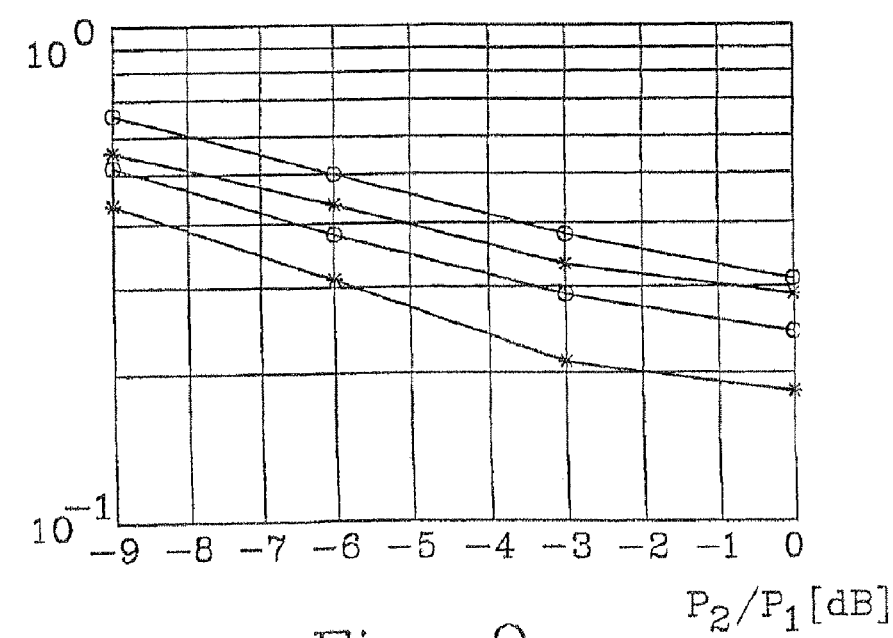
FIG. 9 shows a diagram of two-cell detection in Flat channel

FIG. 8 shows a diagram of a simulation of a two-cell probability of misdetection in "Full" channel at 0 dB SNR, and FIG. 9 shows a diagram of a simulation of a two-cell probability of misdetection in "Flat" channel at 0 dB SNR. The solid lines in FIGS. 8 and 9 represents one period of operation and the dashed lines in FIGS. 8 and 9 represents two periods of observation. The lines with stars in FIGS. 8 and 9 represents Array 1 (Costas 16) and lines with circles in FIGS. 8 and 9 represents Array 2 (Costas 30).

$P_1$ and $P_2$ in FIGS. 8 and 9 are the received power from respective pilot signal.

The performance in "Full" channel, FIG. 8, is reasonable good with only one (Q=1) period of observation, considering the hidden fact that the stronger of the two cells is detected most of the time even though the weaker one is missed. In a channel with some time selectivity, the performance may be improved to a desirable level by increasing the number of pilot periods accumulated, as evidenced by the 3 dB gain at 10% error rate with Q=2. For the "Flat" channel case, on the other hand, the gain observed for Q=2 is mainly to the noise suppression rather than diversity since the slopes of the curves remains unchanged.

In addition to observing more pilot periods, the detection performance may be further improved by a few other measures or under certain conditions. For example, the number of hypotheses of the initial time-frequency offset $(\tau_0,\nu_0)$ may be increased. This effectively increases the search density and therefore the chances of finding the peaks of the log-likelihood function at the cost of computational complexity. A network planner may also impose constraints on the identification index $(\eta,\mu,\phi)$ to reduce the false alarm rate. Finally, the initial time-frequency offsets among the cells and terminals are most likely more than those assumed in the simulation. The symbol-alignment among the cells in particular, a basic assumption in an OFDM system, should reduce the interference quite significantly.

A detector performing the described method for detecting a pilot pattern may naturally be implemented in a node of a communication system, such as a base station, mobile telephone, or any other type of wireless communication device. The method is preferably implemented as software code stored in a memory unit, and executed by a processing device.

The underlying design principle has been to conform with the orthogonal time-frequency division format inherent in an OFDM system, thereby leading to receiver algorithms that involve mostly conversions between time and frequency (or delay and Doppler) domains preferably using DFT. Since demodulation of data symbols is also accomplished with DFT, a dedicated and flexible hardware DFT accelerator can handle almost all the computations in receiving data bits from a modem.

The invention claimed is:

1. A method for detecting a pilot pattern, comprising a pilot signal $s_p(t)$, t=time, in a received signal r(t) implemented in an Orthogonal Frequency Division Multiplexing (OFDM) system, said method comprising:

computing a value of a log-likelihood function $\Lambda(\tau_0,\nu_0)$, $\tau$=delay, $\nu$=Doppler shift, for a hypotheses space specified by the pilot signal $s_p(t)$ and an initial time frequency offset $(\tau_0,\nu_0)$, said log-likelihood function defined by:

$$\Lambda(\tau_0, \nu_0) = \int_0^{\nu_{max}} \int_0^{\tau_{max}} |I(\tau + \tau_0, \nu + \nu_0)|^2 \, d\tau \, d\nu$$

where $$I(\tau, \nu) \triangleq \int r(t) s_p^*(t-\tau) e^{-j2\pi\nu t} dt$$

where $I(\tau,\nu)$ is a delay-Doppler image, r(t) is the received signal including the pilot pattern, and $s^*_p(t)$ is a hypothesized pilot signal, and relating the computed value to a reference value to detect the pilot pattern.

2. The method according to claim 1, wherein the reference value is a threshold value, and the act of relating the computed value comprises comparing the computed value against said threshold value.

3. The method according to claim 1, wherein the act of relating the computed value comprises evaluating and comparing the computed value among possible hypotheses of the pilot signal $s_p(t)$ and initial time frequency offset $(\tau_0,\nu_0)$.

4. The method according to claim 1, wherein the act of computing a value is a direct evaluation of the log-likelihood function $\Lambda(\tau_0,\nu_0)$, said evaluation comprises:

performing a delay-Doppler correlation, and integrating an energy over the hypotheses space.

5. The method according to claim 1, wherein the method further comprises sampling the received signal r(t) to obtain samples $r_{\tau_0,\nu_0}[n,i]$ to compute the log-likelihood function, said samples has a time offset $\tau_0$ and frequency offset $\nu_0$ sampled at the chip rate of $1/T_c$, $T_c$-chip duration, and that said method further comprises choosing the delay hypothesis $\tau_0$ to be multiples of the chip duration $T_c$.

6. The method according to claim 1, wherein said log-likelihood function $\Lambda(\tau_0,\nu_0)$ is approximated by discrete sums of its sampled version as $$\Lambda(\tau_0, \nu_0) \approx \sum_{k=0}^{K-1} \sum_{l=0}^{Q-1} |I_{\tau_0,\nu_0}[k,l]|^2$$

where $$I_{\tau_0,\nu_0}[k,l] = \sum_{n=0}^{QN-1} e^{\frac{-j2\pi \ln}{QN}} \sum_{i=0}^{N_{\!f\!f}-1} r_{\tau_0,\nu_0}[n, i+k] c_n^*[i]$$

where Q=number of periods accumulated in time, $K=N_{\!f\!f}/M$, $N_{\!f\!f}$=number of subcarriers in an OFDM symbol, M=pilot insertion period and $I_{\tau_0\nu_0}[k,i]$ is a sampled delay-Doppler image sampled at a chip rate $1/T_c$ Hz in the delay domain and $QNT_s$ sec. in the Doppler domain.

7. The method according claim 5, wherein the computed value of the log-likelihood function $\Lambda(\tau_0,\nu_0)$ is evaluated in the frequency domain using Discrete Fourier Transform (DFT).

8. The method according to claim 7, wherein the log-likelihood function is evaluated in the frequency domain by:

$$\sum_{k=0}^{K-1}\sum_{l=0}^{Q-1}|I_{\tau_0,\nu_0}[k,l]|^2 = \sum_{n=0}^{QN-1}\sum_{m=0}^{N_{fft}-1}|R_{\tau_0,\nu_0}[n,m]C^*[n,m]|^2$$

which is the sum of received signal energy over the locations of the hypothesized pilot signal on a discrete time-frequency plane, where $$R_{\tau_0,\nu_0}[n,m] = \sum_{i=0}^{N_{fft}-1} r_{\tau_0,\nu_0}[n,i]e^{-\frac{j2\pi mi}{N_{fft}}}$$

is a length—$N_{fft}$ DFT of the sampled receive signal corresponding to the n'th OFDM symbol and a time-frequency map:

$$C[n,m] = \sum_{i=0}^{N_{fft}-1} c_n[i]e^{-\frac{j2\pi mi}{N_{fft}}} \quad m=0,1,\ldots,N_{fft}-1$$

is a discrete frequency domain representation of the pilot signal in the n'th OFDM symbol.

9. The method according to claim 5, wherein the computed value of the log-likelihood function $\Lambda(\tau_0,\nu_0)$ is evaluated in the time domain using Discrete Fourier Transform (DFT).

10. The method according to claim 9, wherein the log-likelihood function is evaluated in the time domain by:

$$\sum_{k=0}^{K-1}\sum_{l=0}^{Q-1}|I_{\tau_0,\nu_0}[k,l]|^2 =$$

$$K\sum_{n=0}^{QN-1}\sum_{m=0}^{M-1}\left(\sum_{i=0}^{N_{fft}-1} r_{\tau_0,\nu_0}[n,i]r^*_{\tau_0,\nu_0}[n,i-mK]\right)e^{-j\frac{2\pi\phi_n m}{M}}$$

where Q=number of periods accumulated in time, K=$N_{fft}$/M, $N_{fft}$=number of subcarriers in an OFDM symbol, and M=pilot insertion period.

11. The method according to claim 1, wherein said method for detecting a pilot pattern is used for synchronizing and/or identifying a multiple of devices in a communication network.

12. The method according to claim 11, wherein, each device transmits time-frequency hopping pilot signals having a circularly shifted pattern assigned to each device.

13. A detector implemented in an OFDM system receiving at least one pilot signal generated in said OFDM system, wherein said detector comprises a memory unit and a processing device, and is configured to perform computing a value of a log-likelihood function $\Lambda(\tau_0,\nu_0)$, $\tau$=delay, $\nu$=Doppler shift, for a hypotheses space specified by the pilot signal $s_p(t)$ and an initial time frequency offset $(\tau_0,\nu_0)$, said log-likelihood function defined by:

$$\Lambda(\tau_0,\nu_0) = \int_0^{\nu_{max}}\int_0^{\tau_{max}}|I(\tau+\tau_0,\nu+\nu_0)|^2 d\tau d\nu$$

where $$I(\tau,\nu) \triangleq \int r(t)s_p^*(t-\tau)e^{-j2\pi\nu t}dt$$

where $I(\tau,\nu)$ is a delay-Doppler image, r(t) is the received signal including a pilot pattern, and $s^*_p(t)$ is a hypothesized pilot signal, and relating the computed value to a reference value to detect the pilot pattern.

14. An OFDM system comprising:
at least one base station and at least one mobile communication device,
a first node in the system adapted to transmit a pilot signal, and
a second node in the system adapted to receive said pilot signal, said second node further comprising a detector which is adapted to perform computing a value of a log-likelihood function $\Lambda(\tau_0,\nu_0)$, $\tau$=delay, $\nu$=Doppler shift, for a hypotheses space specified by the pilot signal $s_p(t)$ and an initial time frequency offset $(\tau_0,\nu_0)$, said log-likelihood function defined by:

$$\Lambda(\tau_0,\nu_0) = \int_0^{\nu_{max}}\int_0^{\tau_{max}}|I(\tau+\tau_0,\nu+\nu_0)|^2 d\tau d\nu$$

where $$I(\tau,\nu) \triangleq \int r(t)s_p^*(t-\tau)e^{-j2\pi\nu t}dt$$

where $I(\tau,\nu)$ is a delay-Doppler image, r(t) is the received signal including a pilot pattern, and $s^*_p(t)$ is a hypothesized pilot signal, and relating the computed value to a reference value to detect the pilot pattern.

* * * * *

UNITED STATES PATENT AND TRADEMARK OFFICE
CERTIFICATE OF CORRECTION

PATENT NO. : 8,295,311 B2
APPLICATION NO. : 12/438623
DATED : October 23, 2012
INVENTOR(S) : Guey Page 1 of 3

It is certified that error appears in the above-identified patent and that said Letters Patent is hereby corrected as shown below:

On Title Page 2, in Item (56), under "OTHER PUBLICATIONS", in Column 1, Line 18, delete "30 Aug.—2 Spet." and insert -- 30 Aug.—2 Sept. --, therefor.

In the Drawings

In Fig. 1, Sheet 1 of 5, delete " Ireq. " and insert -- freq. --, therefor.

In the Specification

In Column 1, Line 61, delete "Cony." and insert -- Conv. --, therefor.

In Column 2, Lines 30-33, in Equation (3), delete "
$$= \sum_{i=0}^{N_{\textit{fft}}-1} c_n[i] e^{\frac{j2\pi mi}{N_{\textit{fft}}}},$$
" and insert --
$$= \sum_{i=0}^{N_{\textit{fft}}-1} c_n[i] e^{-\frac{j2\pi mi}{N_{\textit{fft}}}},$$
--, therefor.

In Column 3, Lines 59-60, delete "channel" and insert -- channel. --, therefor.

In Column 3, Lines 61-62, delete "channel" and insert -- channel. --, therefor.

In Column 4, Line 17, after equation, insert Equation No. -- (7) --.

Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,295,311 B2

In Column 4, Lines 46-47, in Equation (9), delete "$$\Lambda(\tau_0,v_0)=-\int |r(t)-\int_{v_0}^{v_0+v_{max}}\int_{\tau_0}^{\tau_0+\tau_{max}}\hat{h}(\tau,v)s_p(t-\tau)e^{j2\pi vt}d\tau dv|^2 dt$$"

and insert

--$$\Lambda(\tau_0,v_0) = -\int \left|r(t) - \int_{v_0}^{v_0+v_{max}}\int_{\tau_0}^{\tau_0+\tau_{max}} \hat{h}_{ML}(\tau,v)s_p(t-\tau)e^{j2\pi vt}d\tau dv\right|^2 dt$$--, therefor.

In Column 5, Line 18, delete "$(0 \leq \tau \leq \tau_{max}, 0 \leq v \leq v_{max})$" and insert --$(0 \leq \tau < \tau_{max}, 0 \leq v < v_{max})$--, therefor.

In Column 6, Line 31, delete "$(0 \leq k \leq K = N_{fft}/M, 0 \leq l < Q)$" and insert --$(0 \leq k < K = N_{fft}/M, 0 \leq l < Q)$--, therefor.

In Column 6, Lines 55-58, in Equation (17), delete "$e^{\frac{j2\pi ln}{QN}+\frac{j2\pi km}{N_{fft}}}$" and insert --$e^{-\frac{j2\pi ln}{QN}+\frac{j2\pi km}{N_{fft}}}$--, therefor.

In Column 7, Line 28, in Equation (20), delete "$\tau_{\tau_0}[n,i]=$" and insert --$r_{\tau_0}[n,i]=$--, therefor.

In Column 10, Line 29, delete "[0, $T_s$) and [0,$f_s$/2)" and insert -- (0, $T_s$) and (0,$f_s$/2) --, therefor.

In the Claims

In Column 12, Line 46, in Claim 5, delete "$T_c$-chip" and insert -- $T_c$=chip --, therefor.

CERTIFICATE OF CORRECTION (continued)
U.S. Pat. No. 8,295,311 B2

In Column 12, Line 65, in Claim 6, delete "$I_{\tau 0 v 0}[k,i]$" and insert -- $I_{\tau_0,v_0}[k,l]$ --, therefor.

In Column 13, Line 1, in Claim 7, delete "according" and insert -- according to --, therefor.

In Column 13, Lines 27-29, in Claim 8, delete "$C[n,m] = \sum_{i=0}^{N_{fft}-1} c_n[i] e^{-\frac{j2\pi mi}{N_{fft}}}$" and insert -- $C[n,m] = \sum_{i=0}^{N_{fft}-1} c_n[i] e^{-\frac{j2\pi mi}{N_{fft}}},$ --, therefor.